United States Patent [19]

Adkison, Jr.

[11] E Re. 28,893

[45] Reissued July 6, 1976

[54] DOOR LOCK

[76] Inventor: Archie D. Adkison, Jr., 7007 Chapel Woods Lane, Kansas City, Mo. 64152

[22] Filed: Apr. 17, 1975

[21] Appl. No.: 568,916

Related U.S. Patent Documents

Reissue of:

[64] Patent No.: 3,731,965
Issued: May 8, 1973
Appl. No.: 207,478
Filed: Dec. 13, 1971

[52] U.S. Cl. ..... 292/292; 292/1
[51] Int. Cl.[2] ..... E05C 1/18
[58] Field of Search ..... 292/292, 1, 193, 294, 292/295, 297, 289, 291, 248

[56] References Cited

UNITED STATES PATENTS

| | | | |
|---|---|---|---|
| 761,955 | 6/1904 | Glock et al. | 292/292 |
| 1,947,773 | 2/1934 | Haviland | 292/292 |
| 3,432,199 | 3/1969 | Sorrell | 292/292 |

*Primary Examiner*—Richard E. Moore
*Attorney, Agent, or Firm*—Lowe, Kokjer, Kircher, Wharton & Bowman

[57] ABSTRACT

A lock for use with a door having a latch which is adapted to be received in a notch located in the door frame can be utilized either as a permanently-installed lock or as a portable lock that can easily be moved to various locations. A planar member is adapted to be disposed between the door frame and the door when the latter is in closed position. A laterally extending tab is disposed at a right angle to the planar member and is adapted to be received in the notch. A pair of slots in the member are mirror images of each other and diverge away from a divider element that lies in a horizontal plane passing through the tab. Each slot is configured to present a plurality of seats for receiving a keeper pin adjacent the door, when the latter is closed, to present a dead bolt lock. By simply turning the member 180° the lock can accommodate either a left or right-hand opening door with the opposite slot being utilized for each position of the member. A housing is normally disposed in the notch of a door frame and is permanently secured to the frame by a pair of fasteners. The planar member has a pair of arms which are adapted to be disposed on either side of the notch and by removing the housing and inserting the fasteners through appropriate openings in the aforementioned arms, the lock apparatus may be permanently mounted on the door frame.

8 Claims, 7 Drawing Figures

DOOR LOCK

Matter enclosed in heavy brackets [ ] appears in the original patent but forms no part of this reissue specification; matter printed in italics indicates the additions made by reissue.

This invention relates to door locks generally and, more particularly, to apparatus which can be temporarily installed and moved from one location to another to present a positive dead bolt lock or installed permanently on a door frame to present such a lock.

While bolt action locks fastened to the outside of a door have long been known as the surest way of locking a door from the inside, locks of this type have not been widely used in modern construction because of their unattractive appearance. There has, therefore, been a great need for a lock having the security advantages of a bolt action lock but which does not detract from the appearance of a door on which the lock is located.

Another long recognized need in the field of door locks has been a lock which could be easily moved from one location to another for use in homes and businesses as well as hotels and motels where satisfactory door locks are often lacking.

It is therefore an object of the present invention to provide apparatus for locking a door which incorporates the positive locking feature of a bolt action lock without detracting from the appearance of the door.

Another very important object of this invention is to provide lock apparatus for a door which can be permanently mounted on the door frame to replace the housing that is normally disposed in the notch for the door latch.

As a corollary to the above object, one of the aims of the invention is to provide a lock apparatus which can be temporarily installed on a door and moved to another location without the need for removing any fasteners or the like, whereby the lock is completely portable.

It is also one of the aims of my invention to provide lock apparatus which can be permanently installed on the door frame and which includes an element that presents a follower surface for the door latch to preclude any possibility of the latch catching on the lock structure.

Still another one of the objectives of the present invention is to provide a lock apparatus for doors wherein the apparatus can be permanently installed on the door frame in place of the housing which is normally disposed in the notch for the door latch and, wherein the apparatus does not project from the door frame any substantial amount beyond the normal latch housing.

A further objective of this invention is to provide lock apparatus for doors which can be either permanently installed or completely portable and wherein the apparatus includes a pair of locking slots which are mirror images of each other to permit the apparatus to be utilized on either right-hand or left-hand opening doors.

Figure 1:
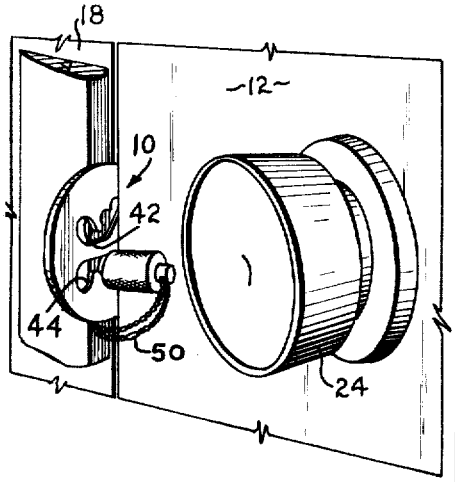
FIG. 1 is a fragmentary perspective view of a door and door frame with the lock apparatus of the present invention installed thereon.
Figure 5:
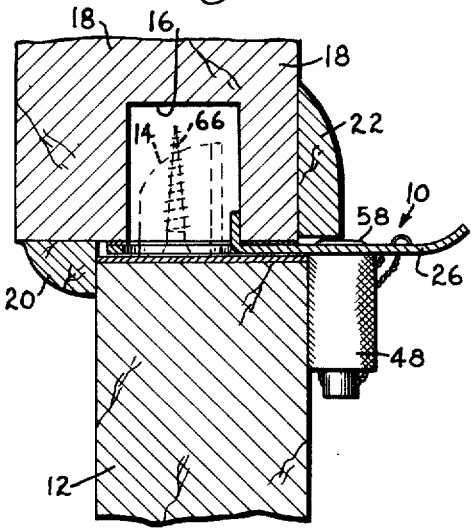
FIG. 5 is a horizontal cross-sectional view through the door and door frame illustrating the lock apparatus in place.

Referring initially to FIGS. 1 and 5, the lock apparatus of the present invention is designated generally by the numeral 10 and is shown installed for use with a door 12 having a latch 14. The latch 14 is normally received in a notch 16 in a door frame 18 when door 12 is closed. The door frame 18 includes a door jamb 20 against which door 12 is disposed when closed and a strip of molding 22 on the inside of the door frame for aesthetic purposes. Latch 14 is normally biased into its extended position by appropriate spring means (not shown) and is moved to a retracted position within the door by turning of a doorknob 24.

Figure 4:
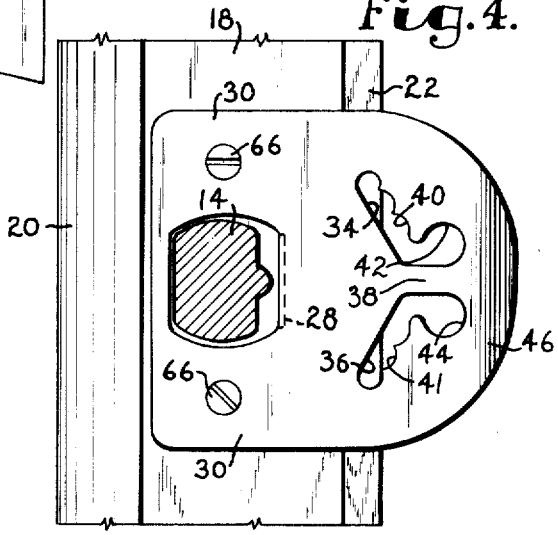
FIG. 4 is an enlarged elevational view of the planar member which forms a part of the locking apparatus as it would appear permanently installed on the frame of a right-hand opening door.
Figure 2:
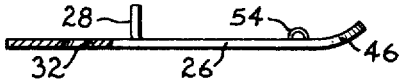
FIG. 2 is a top plan view of the planar member which forms a part of the lock apparatus of the invention.
Figure 3:
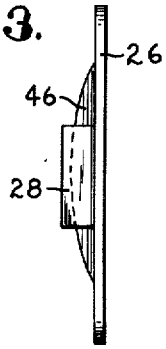
FIG. 3 is an elevational view taken from one end of the member shown in FIG. 2.

The lock apparatus 10 is shown in greater detail in FIGS. 2–4 and includes a generally planar member 26 having a laterally extending tab structure 28 projecting therefrom at a right angle. The tab structure 28 is adapted to be received within notch 16 as clearly illustrated in FIG. 5. On either side of tab structure 28 are a pair of arms 30 which lie adjacent notch 16 when the tab structure is disposed within the notch. Each of the elements 30 has an aperture 32 (FIG. 2) therethrough for purposes to be made clear hereinafter.

A pair of slots 34 and 36 in member 26 are disposed in spaced relationship to tab structure 28. As best illustrated in FIG. 4, slots 34 and 36 are mirror images of each other and lie on opposite sides of an imaginary horizontal plane which bisects tab structure 28 when the latter is disposed in notch 16. A divider element 38 separates slots 34 and 36 and lies in the aforementioned imaginary horizontal plane. It is to be noted that the slots 34 and 36 diverge away from divider element 38 in a broken V configuration with the element 38 intersecting the apex of the broken V. Each of slots 34 and 36 has one edge comprised of a series of curvilinear lines that present a plurality of seats 40 and 41 in each of the slots respectively. In communication with slots 34 and 36 adjacent divider element 38 are a pair of generally circular openings 42 and 44 which are of a slightly larger diameter than the diameter of seats 40 and 41.

At the end of planar member 26 which is opposite the tab structure 28 a chamfer 46 is disposed in perpendicular relationship to divider element 38. Chamfer 46 presents a camming surface for latch 14 which moves the latch inwardly against the action of its biasing springs to permit the latch to clear the planar member. To this end, divider element 38 which is integral with chamfer 46 presents a follower surface that merges into the camming surface presented by the chamfer so that latch 14 will move uninterrupted along planar member 26 with no danger of the latch catching on the edges of slots 34 and 36.

Figure 7:
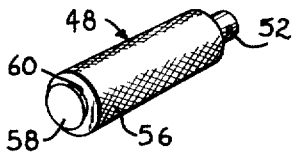
FIG. 7 is an enlarged perspective view of the keeper pin which functions as a dead bolt lock in the apparatus of the invention.

A keeper pin 48 is illustrated in FIG. 7 and is coupled with planar member 26 by a chain 50 which passes through an appropriate aperture 52 in the pin and also extends through a loop 54 (FIG. 2) on the side of member 26 which is opposite tab structure 28. Keeper pin 48 comprises an elongated cylinder bolt 56 having a knurled outer surface and a head 58 of a slightly smaller diameter than the diameter of bolt 56. Head 58 extends outwardly from the end of bolt 56 and the space between the head and the bolt presents a channel 60.

Figure 6:
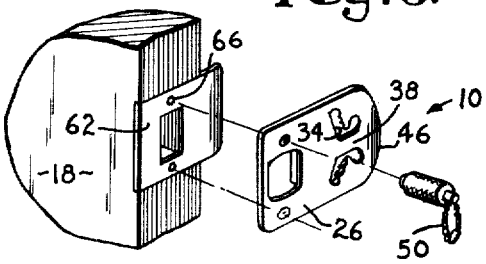
FIG. 6 is an exploded perspective view illustrating the manner in which the lock apparatus replaces the housing normally found on the door frame.

As illustrated in FIG. 6, door frame 18 normally includes a housing 62 disposed in notch 16 and having a chamfer 64 which presents a camming surface for latch 14. The housing 62 is permanently secured to frame 18 by a pair of fasteners such as screws 66. When the lock apparatus 10 of the present invention is to be permanently installed on a door frame, screws 66 may be removed to free housing 62 and the latter replaced by planar member 26. Thus, screws 66 can be inserted through apertures 32 to permanently mount member 26 as best illustrated in FIG. 5.

With member 26 permanently installed on the door frame, door 12 may be opened and closed in the usual manner without interference from the lock apparatus. It is to be noted that planar member 26 projects beyond the door frame a distance approximately equivalent to the distance which chamber 64 on housing 62 would normally project, and thus the lock apparatus presents no hazards extending beyond the door frame a substantial distance. It is also a desirable feature of the invention that divider 38 and chamfer 46 cooperate to provide a continuous surface which latch 14 may slide along with no obstruction from the lock apparatus.

Keeper pin 48 is normally chained to member 26 and allowed to hang at the side of the door frame when lock apparatus 10 is not in use. When door 12 is closed against jamb 20 and it is desired to positively lock the door, the head of keeper pin 48 is inserted into the appropriate lower-most opening 42 or 44 and moved into the respective slot 34 or 36 with channel 60 in the keeper pin guiding movement of the latter. The keeper pin is placed in the appropriate seat adjacent door 12 so that the pin is contiguous with the door as best illustrated in FIG. 5.

With pin 48 disposed as illustrated in FIG. 5, cylinder bolt 56 presents a positive "dead bolt" lock which cannot be forced or manipulated from the outside of the door. It is to be understood that the term "dead bolt" refers to the fact that bolt 48 cannot be removed except by the positive action of a person lifting it out of its seat and removing it from the appropriate slot which must be done from the inside of the door. The fact that head 58 is received on one side of member 26 and the end of cylinder bolt 56 abuts the opposite side of the member with channel 60 actually being received in the appropriate seat, absolutely precludes any form of jarring or vibrating action from causing the bolt to fall from the slot.

It is of course normally desired to have keeper pin 48 disposed in the lowermost slot of member 26 such that any jarring or vibrating action will tend to move the pin downwardly against door 12 rather than away from the door as would be the case if the keeper pin were placed in the uppermost slot. Thus, it is desirable to have slots 34 and 36 constructed as mirror images of each other so that the lock apparatus can be used with either right-hand or left-hand opening doors by simply rotating member 26 180° and always utilizing the lowermost slot.

When lock apparatus 10 is to be temporarily installed and moved from one location to another, tab structure 28 is inserted in the opening in housing 62 which overlies notch 16 and planar member 26 is held in place until door 12 is closed. Keeper pin 48 can then be moved into the appropriate slot as previously explained. Because of the positive "dead bolt" locking action of the keeper pin, door 12 cannot be opened from the outside even though member 26 is not permanently secured to the door frame. Thus, the locking apparatus can be quickly dismantled and utilized at a different location without the need to undo screws such as 66 or the like.

It will be appreciated by those skilled in the art that certain variations in the construction of the lock apparatus 10 can be accommodated without departing from the present invention. For example, slots 34 and 36 could be disposed in diverging relationship with openings 42 and 44 located at the distal ends of the slots rather than the adjacent ends as shown in the drawing.

Having thus described the invention, what is claimed as new and desired to be secured by Letters Patent is:

1. Lock apparatus for use with a door having a latch adapted to be received in a notch located in the door frame, said apparatus comprising:

a planar member adapted to be disposed between the door and the frame;

structure extending laterally from the planar member and adapted to be received in said notch when said member is placed between the frame and the door, said member having a pair of slots therein disposed in diverging relationship to a horizontal plane passing through said structure when the latter is received in the notch, said member including a divider element lying in said horizontal plane for separating said slots one from the other;

each of said slots having at least one edge thereof configured to present a plurality of seats along the edge of the slot; and keeper means adapted to be received in one of said slots when said member is disposed between the door and the frame with the keeper means received in the seat adjacent the door whereby said keeper means presents a dead bolt lock to preclude opening of the door.

2. The invention of claim 1, wherein said member includes a chamfer generally perpendicular to said horizontal plane at the end of the member opposite said structure, said chamfer presenting a camming surface for the door latch prior to the latter being received in said notch.

3. The invention of claim 2, wherein is included means for permanently mounting said member on said frame with said structure disposed in said notch.

4. The invention of claim 3, wherein each of said slots is a mirror image of the other slot whereby the apparatus can be utilized with either right or left-hand opening doors by rotating said member 180° and placing said keeper means in the opposite slot.

5. The invention of claim 1, said apparatus being adapted for use with a door frame having a housing complemental to said notch and secured by a pair of fasteners passing therethrough, said member comprising:

a pair of arms adapted to be disposed on either side of said notch, with an opening in each arm for placement of one of said fasteners, whereby said housing can be removed and replaced with said member mounted on said frame.

6. *Lock apparatus for use with a door having a latch adapted to be received in a notch in the door frame, said apparatus comprising:*

*a planar member adapted to be disposed between the door and the frame;*

*said member having a pair of slots therein disposed in diverging relationship to a horizontal plane passing through said structure when the latter is disposed between the door and the frame;*

*said member including a divider element lying in said horizontal plane for separating said slots one from the other;*

*each of said slots having at least one edge thereof configured to present a plurality of seats along the edge of the slot;*

*means for mounting said member on said frame; and*

*keeper means adapted to be received in one of said slots when said member is disposed between the door and the frame with the keeper means received in the seat adjacent the door whereby said keeper means presents a dead bolt lock to preclude opening of the door.*

7. *The invention of claim 6, wherein each of said slots is a mirror image of the other slot whereby the apparatus can be utilized with either right or left-hand opening doors by rotating said member 180° and placing said keeper means in the opposite slot.*

8. *The invention of claim 6, said apparatus being adapted for use with a door frame having a housing complemental to said notch and secured by a pair of fasteners passing therethrough, said member comprising:*

*a pair of arms adapted to be disposed on either side of said notch, with an opening in each arm for placement of one of said fasteners, whereby said housing can be removed and replaced with said member mounted on said frame.*

* * * * *